Patented Oct. 19, 1943

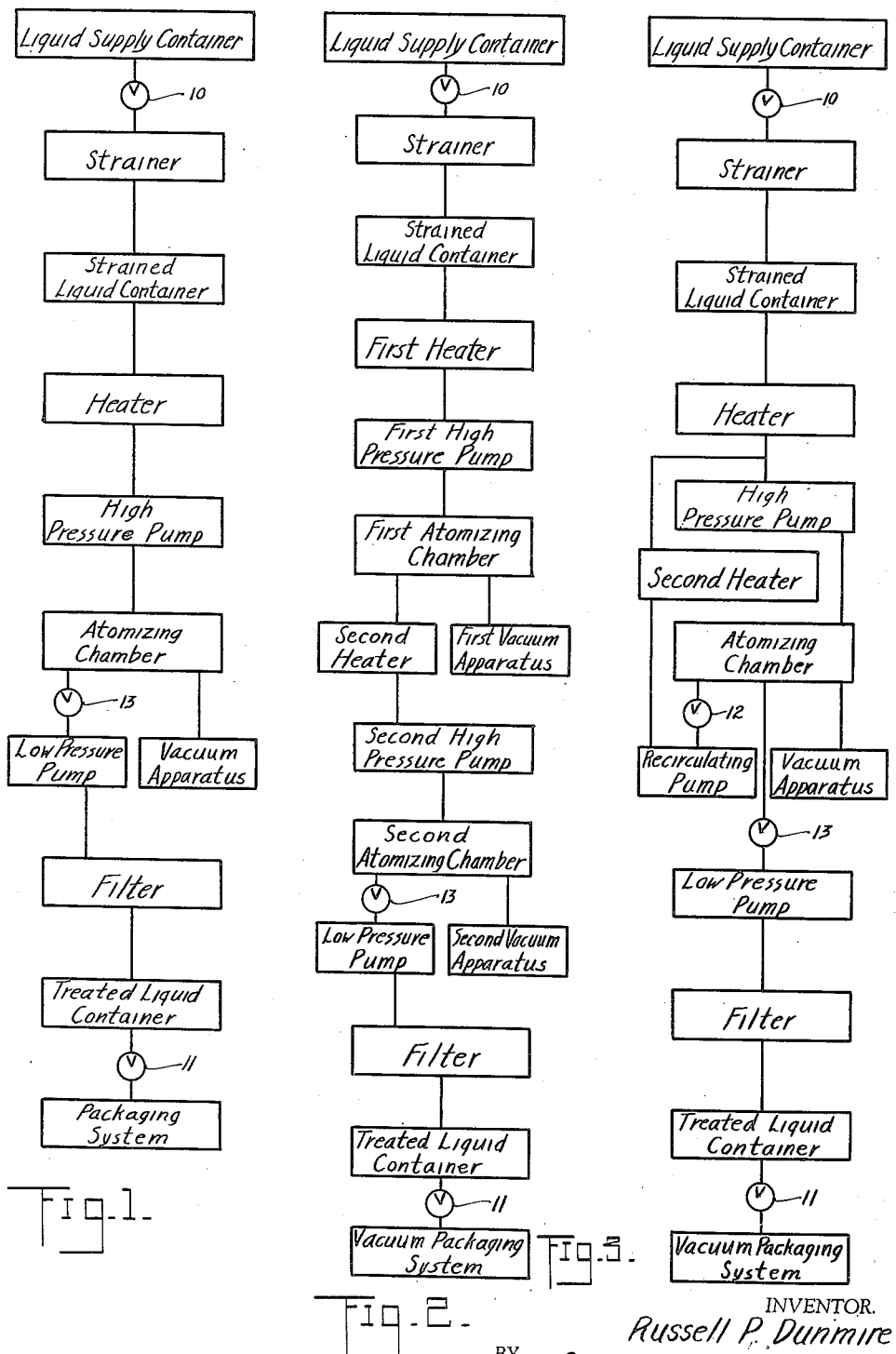

2,331,895

UNITED STATES PATENT OFFICE 2,331,895

TREATMENT OF ORGANIC LIQUIDS

Russell P. Dunmire, Alliance, Ohio, assignor, by mesne assignments, to Buckeye Laboratories Corporation, Cleveland, Ohio, a corporation of Ohio Application July 8, 1939, Serial No. 283,390

11 Claims. (Cl. 99—212)

My invention relates in general to a method of treating and purifying organic liquids and more particularly to the method of treating and purifying food beverages including milk.

Organic liquids are subject to deterioration brought about by the action of oxidation upon the exposure of the organic liquid to air. Considerable oxygen is absorbed from air which in turn functions to form organic acids. These in turn become catalysts and increase the rate of the reaction occurring to such an extent that within a relatively short period of time the organic liquid is rendered substantially valueless because of the formation of oxidized and polymerized compounds which destroy their original characteristics.

An object of my invention is to provide for treating an organic liquid to substantially prevent the deterioration thereof.

Another object of my invention is to provide for removing both free and dissolved oxygen and air from an organic liquid in order to prevent the deterioration thereof.

Another object of my invention is to provide for treating and condensing an organic liquid to reduce the volume of the packaging container in which the treated liquid may be stored for commercial distribution.

Another object of my invention is to provide for treating an organic liquid without materially affecting the taste or vitamins contained therein.

Another object of my invention is to provide for not only pasteurizing but also sterilizing the organic liquid being treated, as well as refrigerating same.

Another object of my invention is to provide for destroying the small organic particles such as seeds, spores, and bacteria in the organic liquid.

Another object of my invention is to provide for destroying the small organic particles such as seeds, spores, and bacteria by first impregnating the organic particles with the light volatile constituents of the liquid and then exploding the organic particles by subjecting the liquid to a sudden drop in pressure.

Other objects and a fuller understanding of my invention may be had by referring to the following description and claims, taken in conjunction with the accompanying drawing, in which:

Figure 1 is a diagrammatic illustration of the equipment and steps for carrying out my method of treating an organic liquid in accordance with the teaching of my invention;

Figure 2 is a diagrammatic illustration of a modified arrangement of the equipment and steps in carrying out my method of treating an organic liquid in accordance with the teaching of my invention, and Figure 3 is a diagrammatic illustration of another arrangement of the equipment and steps in carrying out my method of treating an organic liquid in accordance with the teaching of my invention.

I have found through a long series of experiments that the deterioration of an organic liquid can be eliminated almost permanently by removing both the free and dissolved air and water from the organic liquid. The reduction in the quantities of oxygen available may be reduced to such an extent that deterioration is practically nil, over a long period of time. For example, I have found that by reducing the contents of air and water in milk by my process to the point where the volume of the milk is reduced to approximately 50% of its normal volume, producing a condensed substance, the process of deterioration is virtually stopped. In addition to checking the process of deterioration, experiments show that other valuable benefits are attained. Thus, for example, my method destroys the small organic particles such as seeds, spores, and bacteria, effecting pasteurization and sterilization of the organic liquid, as well as refrigerating the treated liquid before packaging the same in commercial containers for distribution.

In general, my process of treating organic liquids comprises the steps of raising the pressure of the organic liquid substantially above atmospheric pressure to impregnate the small organic particles with the light volatile constituents of the liquid, heating the liquid to supply latent heat of evaporation, spraying the heated liquid into a rarified atmosphere maintained under a high vacuum for instantaneously releasing the light volatile constituents which explodes the impregnated small organic particles and refrigerates the liquid, and separating the released volatile constituents from the treated and purified organic liquid and packaging the latter into containers for commercial distribution.

With reference to Figure 1 of the drawing, my process when applied to the treating of milk may be described as follows: The raw milk is placed in the liquid supply container which may be in the form of any suitable storage container. To operate the equipment, the valve 10 is opened which allows the milk to enter a strainer of any suitable type such, for example, as a rotary strainer or a centrifuge. As the milk passes through the strainer the solid impurities are removed. From the strainer the milk passes to a strained liquid container which may be of a relatively small capacity and is arranged to provide an even and continuous flow of the milk. From the strained liquid container the milk enters a heater of any suitable form. In the heater, the milk is heated to supply latent heat of evaporation to the volatile constituents of the milk. I have found that the milk may be heated from a temperature of 80 to 142 degrees F. and preferably in the neighborhood of 90 degrees F. After the milk is heated it then passes to a high pressure pump where it may be subjected to a pressure of from 1000 to 4000 pounds per square inch to impregnate the small organic particles in the milk with the light volatile constituents of the milk. I find from experimentations that the pressure within the range of 1000 to 4000 pounds per square inch gives very excellent results and that lower pressures may be used with a varying degree of accomplishment. The heated liquid upon leaving the high pressure pump is sprayed into an atomization chamber having a rarified atmosphere maintained under a high vacuum. The vacuum may vary between 28 to 30 inches of mercury as referred to a 30 inch barometer. The expansion of the liquid as it is sprayed into the vacuum atomizing chamber is so rapid as to be almost of an explosive nature. In fact, the surface tension of the milk appears to be overcome so rapidly that no frothing occurs. As the explosion occurs light volatile constituents of the milk are converted from liquid to gas almost instantaneously. The ratio of volume of liquid to gas was found to be in the ratio of 1 to approximately 200,000. The explosion of the lower boiling point liquids or the light volatile constituents completely disrupts the film of the higher boiling point liquids surrounding the lower point liquids. The disruption of the higher boiling point liquids removes both free and dissolved oxygen and air from the milk and allows the higher boiling point substances to form a solid stream of gas free liquid. The vaporized light volatile constituents and the water vapor and other gases are removed from the atomizing chamber through the vacuum apparatus used in maintaining the high vacuum in the atomizing chamber. The gas free higher boiling point substances of the milk are removed from the atomizing chamber upon the operation of the valve 13 to a low pressure pump which forces the treated milk through a filter into the treated liquid storage container. By operating the valve 11 the treated milk may be delivered to a packaging system where the treated milk may be delivered to commercial containers.

The atomizing chamber may be of any suitable form and may comprise a construction substantially the same as that shown in Patent No. 1,824,498, issued on September 22, 1931, to C. J. Rodman and the present applicant. In carrying out my process I preferably operate the atomizing chamber under a high vacuum of approximately 29.75 inches of mercury as referred to a 30 inch barometer. The resultant action of spraying the milk into the atomizing chamber accomplishes a very desirable feature; namely that of refrigerating the treated liquid to substantially 40 degrees F. while under a high vacuum. This normally reduces the requirement for refrigeration plants for cooling the liquid after pasteurization or sterilization. This may be explained by the fact that according to Marks and Davis steam tables, water at sea level; namely, 14.7 pounds pressure absolute, has a boiling point of 212 degrees F., whereas under a vacuum of 29.75 inches of mercury as referred to a 30 inch barometer at sea level, it has a boiling point of 40 degrees F. I find that the above described method of treating milk comprising supplying the necessary latent heat of evaporation while subjecting the liquid to a high pressure, atomizing the same into a rarified atmosphere and separating the liquid from the gases while under a high vacuum is very economical in that it not only reduces the volume of the milk but also accomplishes refrigeration as well. I further discovered upon examination of the treated milk that not only had pasteurization been effected but also sterilization. The sterilization or the destruction of the organic particles such as seeds, spores or bacteria is effected by instantaneously releasing the light volatile constituents which explodes the impregnated small organic particles. The explosion appears to result from the fact that the light volatile constituents, such as water with which the seeds, spores, and bacteria are impregnated is converted instantaneously from a liquid to a gaseous state. This produces an instantaneous expansion of the organisms from their interior to an enormous extent and thus results in their complete destruction and disintegration, after which the gases are removed and discharged to atmosphere through the vacuum apparatus, thus resulting in the pasteurization and complete sterilization of the milk.

The temperature to which the milk is heated represents a certain amount of latent heat of evaporation available to convert the light volatile constituents into a gas upon being sprayed into the atomizing chamber to destroy the organic particles, as well as determining the degree to which the treated milk may be condensed. The higher that the temperature of the milk is raised the more latent heat of evaporation is available for converting the light volatile constituents into gas, producing more concentration of the liquid. The milk may be heated to a temperature in the neighborhood of 142 degrees which is the temperature at which milk is heated in the ordinary pasteurization process. If the milk is heated to 147 degrees F. caramelization occurs which changes the taste of the milk. Therefore I find that in carrying out my process the milk may be heated from a temperature of 80 to 142 degrees F. depending upon the degree of concentration desired. However, I find that 90 degrees is sufficient to supply an adequate amount of latent heat of evaporation to produce sufficient expansion and shock to kill the organic particles such as bacteria, spores and seeds in the milk, and it is not necessary to heat the milk to 142 degrees F. to kill certain of the organisms to effect pasteurization. Inasmuch as the temperature may be as low as 80 or 90 degrees F., a considerable amount of economy is effected in carrying out my method of treating the milk in preference to the prior methods of pasteurizing milk which requires the milk to be heated to a temperature in the neighborhood of 142 degrees F. The heating of the milk to a higher temperature than 90 degrees F. is only for the purpose of effecting a greater concentration.

In the event that it is desirous of concentrating the milk more than that attained in a single passing of the milk through my process the process may be carried out in tandem, that is, in series. Such a method is shown in Figure 2 which shows two stages of equipment. The process of passing the milk from the liquid supply container to and through the first atomizing chamber is the same as that described with reference to Figure 1. The milk upon leaving the first atomizing chamber then passes through a second heater, a second high pressure pump, and a second atomizing chamber which further processes the milk in the same fashion as that previously described for the first stage of the process. The heated milk upon leaving the second atomizing chamber flows through the valve 13 to a low pressure pump where the milk is forced through a filter to a treated liquid storage container. Upon the operation of the valve 11 the treated milk is delivered to a vacuum packing system where the milk may be packed in vacuum tight containers.

In Figure 3, I show a by-pass arrangement of the equipment for further concentrating the milk, in that a portion of the milk after leaving the atomizing chamber and upon passing through the valve 12 is recirculated by means of a recirculating pump through a second heater to the high pressure pump, valve 13 restricting the flow. The recirculation may be in the ratio of 1 to 3 or more depending upon the degree of concentration desired. Upon the opening of the valve 13 the treated milk flows from the atomizing chamber through a discharge pump which forces the liquid through a filter into the treated liquid storage container, where the liquid may be vacuum packaged upon the operation of the valve 11.

In carrying out my process I find that the taste and the vitamins contained in the milk are in most cases relatively unchanged.

Although I have described my invention with a certain degree of particularity, it is understood that the present disclosure has been made only by way of example and that numerous changes in the details of steps and the combination and arrangement of parts may be resorted to without departing from the spirit and the scope of the invention as hereinafter claimed.

I claim as my invention:

1. The method of treating milk comprising, heating the milk to supply latent heat of evaporation, spraying the heated milk under superatmospheric pressure in the neighborhood of at least 1000 pounds per square inch into a chamber maintained at sub-atmospheric pressure for instantaneously releasing light volatile constituents of milk to destroy the small organic particles in the milk and to refrigerate the milk, and separately removing the released volatile constituents and the treated milk from the chamber.

2. The method of treating milk comprising the steps of raising the pressure of the milk to substantially at least 1000 pounds per square inch to impregnate the small organic particles in the milk with light volatile constituents of the milk, heating the milk to supply latent heat of evaporation, spraying the heated milk into a vacuum chamber of a rarified atmosphere maintained under a high vacuum for instantaneously releasing light volatile constituents to explode the impregnated small organic particles and to refrigerate the milk, and separately removing the released volatile constituents and the treated milk from the chamber.

3. The method of treating milk comprising heating the milk to at least approximately 90 degrees Fahrenheit to supply latent heat of evaporation, raising the pressure of the milk to at least approximately 1000 pounds per square inch to impregnate the small organic particles in the milk with light volatile constituents of the milk, spraying the heated milk into a vacuum chamber of a rarified atmosphere maintained under a high vacuum of approximately 29.75 inches of mercury as referred to a 30 inch barometer for instantaneously releasing light volatile constituents to explode the impregnated small organic particles and to refrigerate the milk to approximately 40 degrees Fahrenheit, and separately removing the released volatile constituents and the treated milk from the chamber.

4. The method of treating milk comprising heating the milk to a temperature of from 80 to 142 degrees Fahrenheit to supply latent heat of evaporation, raising the pressure of the milk to a value of from 1000 to 4000 pounds per square inch to impregnate the small organic particles in the milk with light volatile constituents of the milk, spraying the heated milk into a vacuum chamber of a rarified atmosphere maintained under a high vacuum of from 28 to 30 inches of mercury as referred to a 30 inch barometer for instantaneously releasing light volatile constituents to explode the impregnated small organic particles and to refrigerate the milk, and separately removing the released volatile constituents and the treated milk from the chamber.

5. The method of treating and condensing milk comprising raising the pressure of the milk to substantially at least 1000 pounds per square inch to impregnate the small organic particles in the milk with light volatile constituents of the milk, heating the milk to supply latent heat of evaporation, spraying the heated milk into a vacuum chamber of a rarified atmosphere maintained under a high vacuum for instantaneously releasing light volatile constituents to explode the impregnated small organic particles and to refrigerate the milk, separately removing the released volatile constituents and the treated milk from the chamber, and by-passing a portion of the treated milk from the chamber and re-subjecting it to the above-mentioned steps.

6. The method of treating milk comprising heating the milk to at least approximately 80 degrees Fahrenheit to supply latent heat of evaporation, raising the pressure of the milk to a relatively high value at least sufficient to impregnate the small organic particles in the milk with light volatile constituents of the milk, atomizing the heated milk into a vacuum chamber of a rarified atmosphere maintained under a high vacuum for instantaneously releasing light volatile constituents to explode the impregnated small organic particles and to refrigerate the milk, and separately removing the released volatile constituents and the treated milk from the chamber.

7. The method of treating milk comprising heating the milk to supply latent heat of evaporation, raising the pressure of the milk to at least approximately 1000 pounds per square inch to impregnate the small organic particles in the milk with light volatile constituents of the milk, atomizing the heated milk into a vacuum chamber of a rarified atmosphere maintained under a high vacuum for instantaneously releasing light volatile constituents to explode the impregnated small organic particles and to refrigerate the milk, and separately removing the released volatile constituents and the treated milk from the chamber.

8. A method for the treatment of a food beverage containing light volatile constituents and small organic particles in which the organic particles may include seeds, spores and bacteria, the treatment destroying the small organic particles and comprising raising the pressure of the food beverage in the neighborhood of at least approximately 1000 pounds per square inch to impregnate the small organic particles with light volatile constituents of the food beverage, spraying the food beverage into a vacuum chamber of a rarified atmosphere maintained under a high vacuum for instantaneously releasing light volatile constituents to explode the impregnated small organic particles, and separately removing the released volatile constituents and the treated food beverage from the chamber.

9. A method for the treatment of a food beverage containing light volatile constituents and small organic particles in which the organic particles may include seeds, spores and bacteria, the treatment destroying the small organic particles and comprising raising the pressure of the food beverage in the neighborhood of at least approximately 1000 pounds per square inch to impregnate the small organic particles with light volatile constituents of the food beverage, spraying the food beverage into a vacuum chamber of a rarified atmosphere maintained under a high vacuum for instantaneously releasing light volatile constituents to explode the impregnated small organic particles, separately removing the released volatile constituents and the treated food beverage from the chamber, and by-passing a portion of the treated food beverage from the said chamber and re-subjecting it to the above-mentioned steps.

10. A method for the treatment of a food beverage containing light volatile constituents and small organic particles in which the organic particles may include seeds, spores and bacteria, the treatment destroying the small organic particles and comprising heating the food beverage to supply latent heat of evaporation, raising the pressure of the food beverage in the neighborhood of at least approximately 1000 pounds per square inch to impregnate the small organic particles with light volatile constituents of the food beverage, spraying the food beverage into a vacuum chamber of a rarified atmosphere maintained under a high vacuum for instantaneously releasing light volatile constituents to explode the impregnated small organic particles, and separately removing the released volatile constituents and the treated food beverage from the chamber.

11. The method of treating food beverages containing light volatile constituents and small organic particles in which the organic particles may include seeds, spores and bacteria, comprising heating the food beverages to at least approximately 80 degrees Fahrenheit to supply latent heat of evaporation, raising the pressure of the food beverages to a relatively high value at least sufficient to impregnate the small organic particles in the food beverages with light volatile constituents of the food beverages, atomizing the heated food beverages into a vacuum chamber of a rarified atmosphere maintained under a high vacuum for instantaneously releasing light volatile constituents to explode the impregnated small organic particles and to refrigerate the food beverages, and separately removing the released volatile constituents and the treated food beverages from the chamber.

RUSSELL P. DUNMIRE.